UNITED STATES PATENT OFFICE.

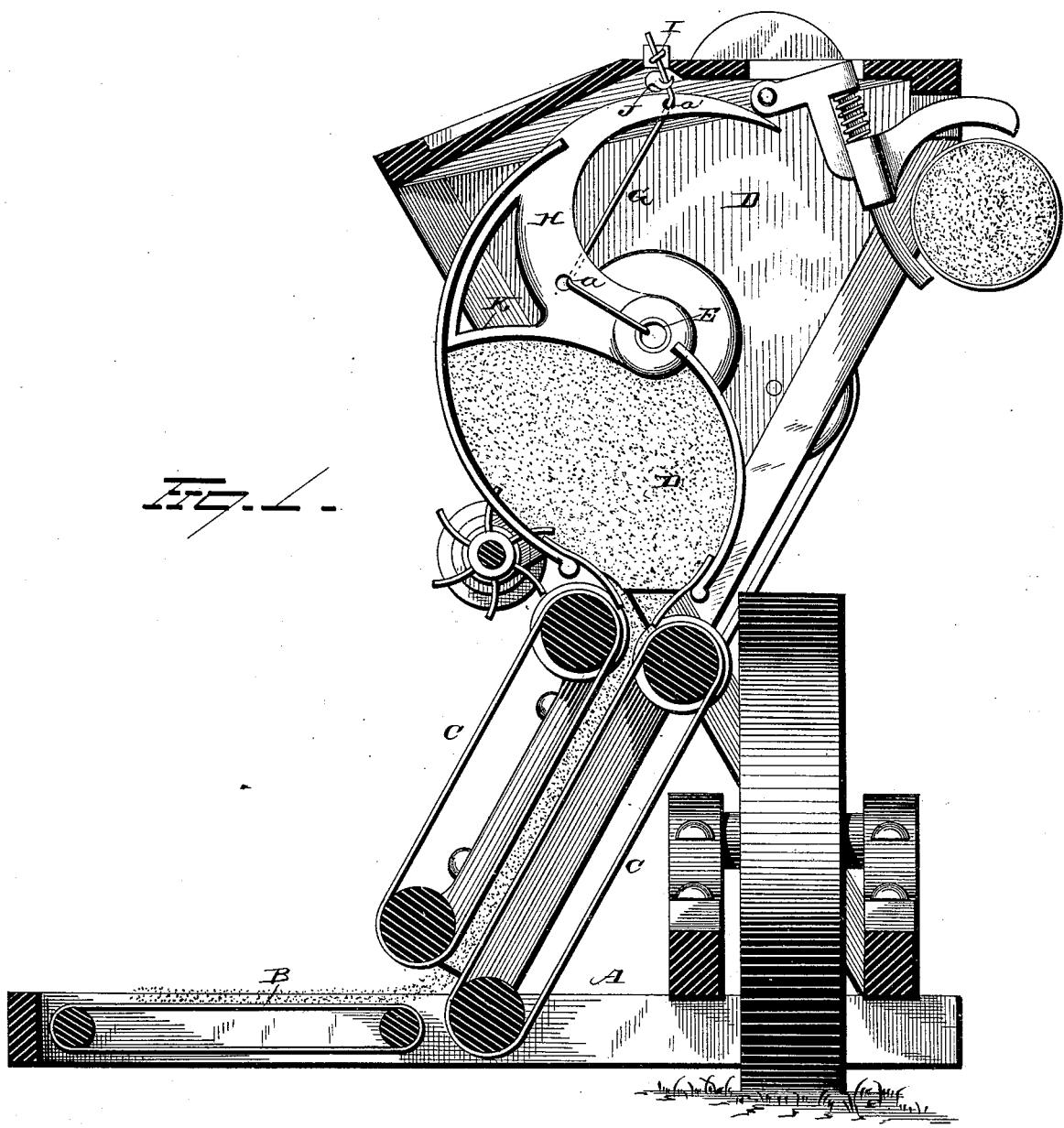

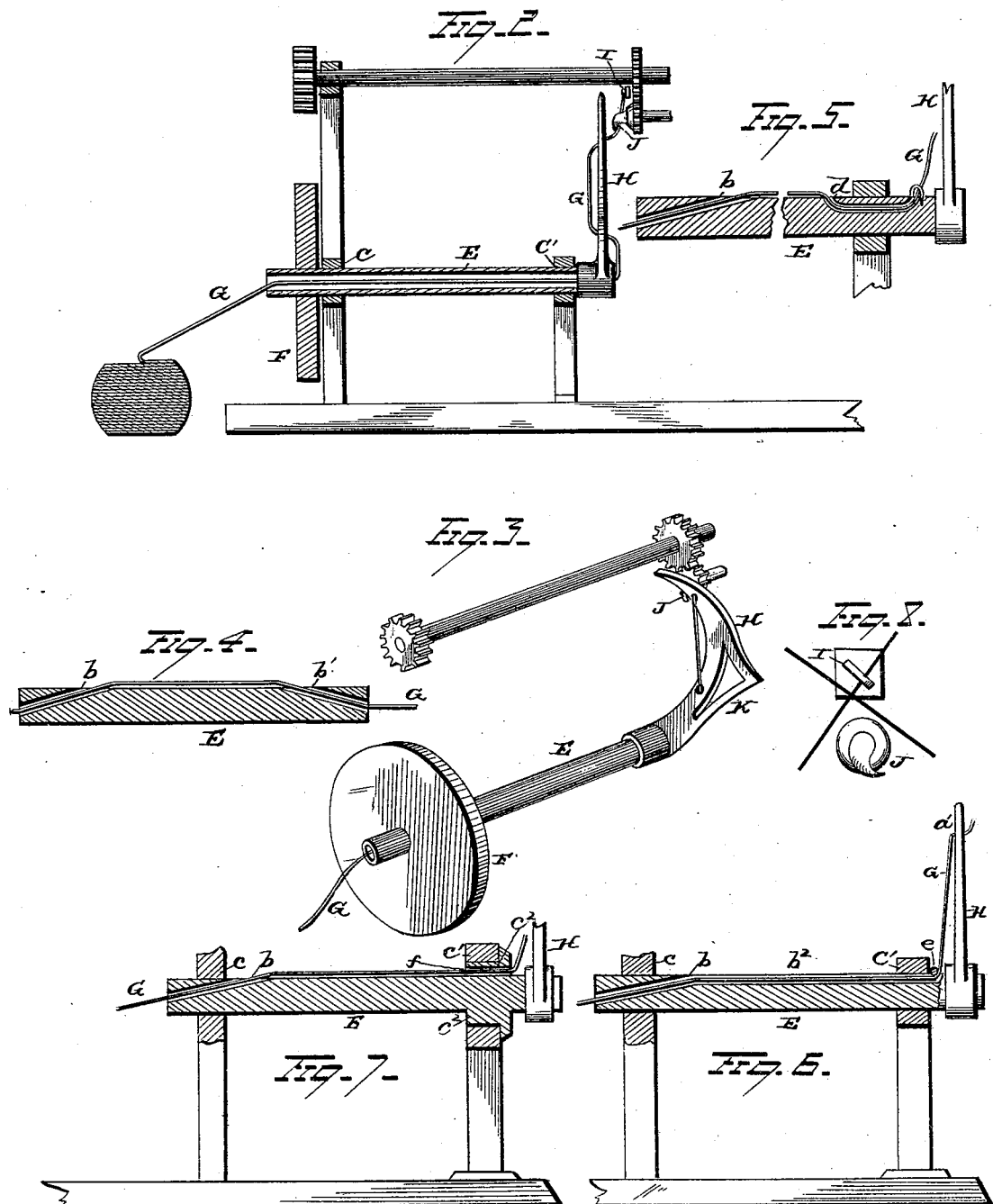

HENRY M. WEAVER, OF MANSFIELD, OHIO.

SELF-BINDER FOR HARVESTERS.

SPECIFICATION forming part of Letters Patent No. 269,491, dated December 19, 1882.

Application filed February 1, 1882. (No model.)

*To all whom it may concern:*

Be it known that I, HENRY M. WEAVER, of Mansfield, in the county of Richland and State of Ohio, have invented certain new and useful Improvements in Self-Binders for Harvesters; and I do hereby declare the following to be a full, clear, and exact description of the invention, such as will enable others skilled in the art to which it pertains to make and use the same.

My invention relates to an improvement in self-binders for harvesters, the object of the same being to provide means for conveying the cord or wire to a binder-arm which has a full rotary motion in such a manner that it will be protected throughout its entire length and prevented from engaging with obstructions which would entangle or break the cord or wire or unwind more from the spool or ball than is necessary to tie one bundle or gavel; and with these ends in view my invention consists in certain features of construction and combination of parts, as will hereinafter be described, and pointed out in the claims.

In the accompanying drawings, Figure 1 shows a vertical sectional view of a grain-binder embodying my improvements. Fig. 2 is a detached view, in side elevation, and partly in section, of the cord-carrying arm and shaft, grasper, knot-tyer, and mechanism for operating the knot-tyer. Fig. 3 is a perspective view of the cord-carrying shaft, arm, and knot-tyer. Figs. 4, 5, 6, and 7 show modifications of the shaft, and Fig. 8 shows the position of the binding-cords before the knot-tyer commences the operation.

A represents the platform, and B an endless apron or carrier upon which the cut grain is delivered from the rear end of the harvester-platform by the harvester-rakes.

C C' are endless carriers or aprons arranged to receive the grain from the carrier B and carry it up and force it into the grain-receiver D.

The construction and operation of the above parts are similar to those shown in Patent No. 232,201, granted Ferris Ogden and myself, and hence need no further special mention here.

E is shaft suitably journaled in the side of the grain-receptacle D and extends into the same, and is provided on the outer end with the drive-wheel F, by means of which a rotary motion is imparted to the said shaft, and also to the said binding or cord-carrying arm secured to the inner end of the said shaft. In Figs. 1, 2, and 3 I have shown this shaft hollowed longitudinally throughout its entire length for the passage of the cord or wire G, and have shown the cord-carrying or binding arm H with the two eyes $a$ and $a'$, also for the passage of the cord or wire G. This cord or wire is supported on any suitable spool or in any suitable receptacle near the outer end of the shaft E, and the free end of the said cord is passed through the shaft E to the outside of the binding-arm H, which latter is situated near the center of the grain receptacle, through the eye $a$ in the said binding-arm, and then through the eye $a'$ of the binding-arm, so that when the cord finally issues from the said binding-arm it will lie on the outside thereof or the side adjacent the grasper I. This grasper I is rigidly secured to the framing of the machine above the grain-receptacle D in close proximity to the knot-tyer J, and is adapted to hold one end of the cord while the binding-arm is making up the gavel.

The construction and operation of the grasper and knot-tyer are fully shown in Patent No. 250,956, granted to Ferris Ogden, and are only shown here in their proper position to give a correct understanding of the case without any reference to their details in construction.

The front face of the binding-arm H is curved to correspond in form to the shape of the gavel, but is provided on its back or convex portion with the rearwardly-extending portion K, which is curved on its under face and adapted to present an increased bearing-surface for the grain when the latter, by its upward movement in the receptacle, operates to start the binding-arm on another revolution, as described in the patent granted to Ogden and myself, before referred to.

The operation of the above parts can be precisely like those in the patent already referred to; or the connecting parts can be modified or the positions changed to suit the circumstances, my main object being, as before stated, to provide means for conveying the cord or wire to the binding-arm in such a manner that it will not become entangled or twisted in any of the parts, and thereby disarrange the parts, or unwind more cord or wire than is necessary to bind the gavel.

The binding-arm H, already referred to, is rigidly secured to the inner end of the shaft E, and extends at right angles throughout its entire length thereto, and is adapted to encircle the gavel near the center thereof.

The method of passing the string around the gavel is as follows: At the beginning of the operation the binding-arm stands as in Fig. 2, with the free end of the cord held by the grasper I, the latter being situated slightly above the knot-tyer J. The carriers C having forced sufficient grain into the receptacle D to start the binding-arm in motion, as the binding-arm rotates the cord is drawn from the spool, and is carried around the gavel until the original position of the binding-arm has been reached, when it again comes to a standstill. When the binding-arms come to a standstill the cords are crossed in the position shown in Fig. 8, within easy reach of the knot-tyer, which at this juncture is caused to revolve and tie the knot.

In the modification shown in Fig. 4 I have shown the shaft E pierced at its opposite extremities by the diagonal holes $b$ $b'$, which latter enable the cord to pass the bearing C and C' and the binding-arm H without engaging therewith. In this construction that portion of the cord lying between the adjacent ends of the holes $b$ and $b'$ rests on the outer surface of the shaft E. In Fig. 5 I have shown the free or outer end of the shaft provided with a diagonal hole or opening, $b$, adapted to enable the cord to safely pass the standard or bracket, while on the opposite side I have provided a curved groove, which enables the cord to pass under the upper surface of the bearing $c'$. In this construction of shaft the cord emerges from the opening or hole $d$ before it reaches the binding-arm, and hence it is only necessary to pass the cord once through the binding-arm instead of twice, as shown in the previous constructions. In Fig. 6 I have shown the shaft provided with the diagonal hole $b$ at its outer end, which leads to a longitudinal slot, $b^2$, on the outer face of the shaft. This slot $b^2$ is merely a continuation of the diagonal slot $b$, and serves to protect the cord throughout its whole length. The cord in this construction also emerges from the slot $b^2$ before reaching the binding-arm, and it then passes over the roller $e$ and through the eye $a'$, near the extreme end of the said binding-arm. Fig. 7 represents still another construction. In this form I have also employed the diagonal slot at the outer end of the shaft to enable me to pass the bearing $c$, and have enlarged the bearing $c^2$ on the opposite side thereof, and provided the said enlarged bearing with the bore or hole $f$ for the passage of the cord. In this construction the cord emerges before reaching the binding or cord-carrying arm, and is passed through the eye $a'$, near the end thereof. It is evident that the bearing on the opposite side of the shaft can also be enlarged, if desired; but the form shown answers all the necessary purposes.

The construction of parts shown obviates all the disadvantages heretofore encountered in the use of a rotary cord-carrying arm, as the cord is always covered and protected, and is consequently prevented from engaging with any portions of the harvester, and thereby becoming entangled or broken.

My device can also be constructed cheaper than those ordinarily used, and it dispenses with the costly hollow binding or cord-carrying arm for accomplishing a similar purpose.

My cord-carrying arm is of the form usually employed in harvesters, and when secured to the shaft rests at right angles thereto, and also at right angles throughout its entire length to the grain-receptacle D.

I have also described my improvement in connection with previous patents; but I do not limit its use to machines constructed as described in the said patents, as it is evident that it can be applied to the majority of harvesters in which the binding or cord-carrying arm has a full rotary motion without necessitating any great changes in the structures thereof.

Having fully described my invention, what I claim as new, and desire to secure by Letters Patent, is—

1. In a grain-binder having the grain-receptacle, and a rotating shaft located over the grain-receptacle and extending to its longitudinal center, a binding and cord-carrying arm secured to the end of the rotary shaft and arranged to rotate at right angles thereto, said shaft and binding-arm being constructed, substantially as described, to allow the binding-cord to pass from the outer end of the rotating shaft through the same and its bearings and through the eye in the outer end of the binding-arm, and a stationary cord-grasping device and cord-tyer, substantially as and for the purpose set forth.

2. In a grain-binder having the binding-arm located at or near the center of the grain-receptacle, and a rotating shaft extending to the center of the grain-receptacle, and having the heel of the binding-arm secured thereto, said binding-arm being arranged at right angles to the shaft, the shaft and binding-arm constructed, substantially as described, to allow the binding-cord to extend from the outer end of the rotary shaft to the heel of the binding-arm and through an eye in the point of the latter, substantially as and for the purpose set forth.

3. The combination, with the rotary shaft extending to the center of the grain-receptacle and located in the upper portion thereof, of the binding-arm constructed with the curved portion K on the rear edge thereof, to constitute a curved stop or abutment for the grain as it is packed into the grain-receptacle, substantially as set forth.

In testimony whereof I have signed this specification in the presence of two subscribing witnesses.

HENRY M. WEAVER.

Witnesses:
WILLIAM H. PRITCHARD,
JOSEPH P. HENRY.